Figure 1:
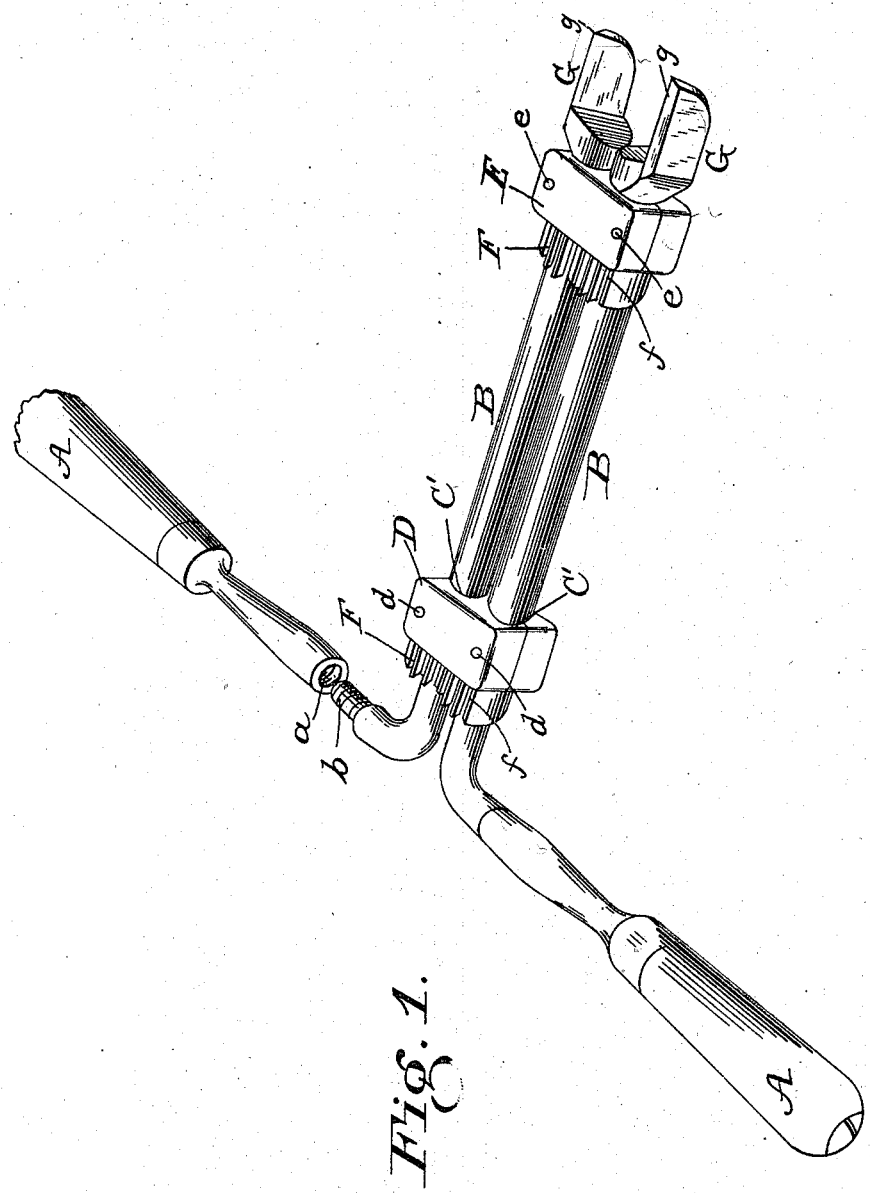

(No Model.)  T. J. PENCE.  2 Sheets—Sheet 1.
VETERINARY TOOTH CUTTER.

No. 571,283.  Patented Nov. 10, 1896.

WITNESSES:  INVENTOR:
Theodore Sullivan  Thomas Jefferson Pence,
E. S. Williams  BY
  Frank M. Burnham,
  ATTORNEY.

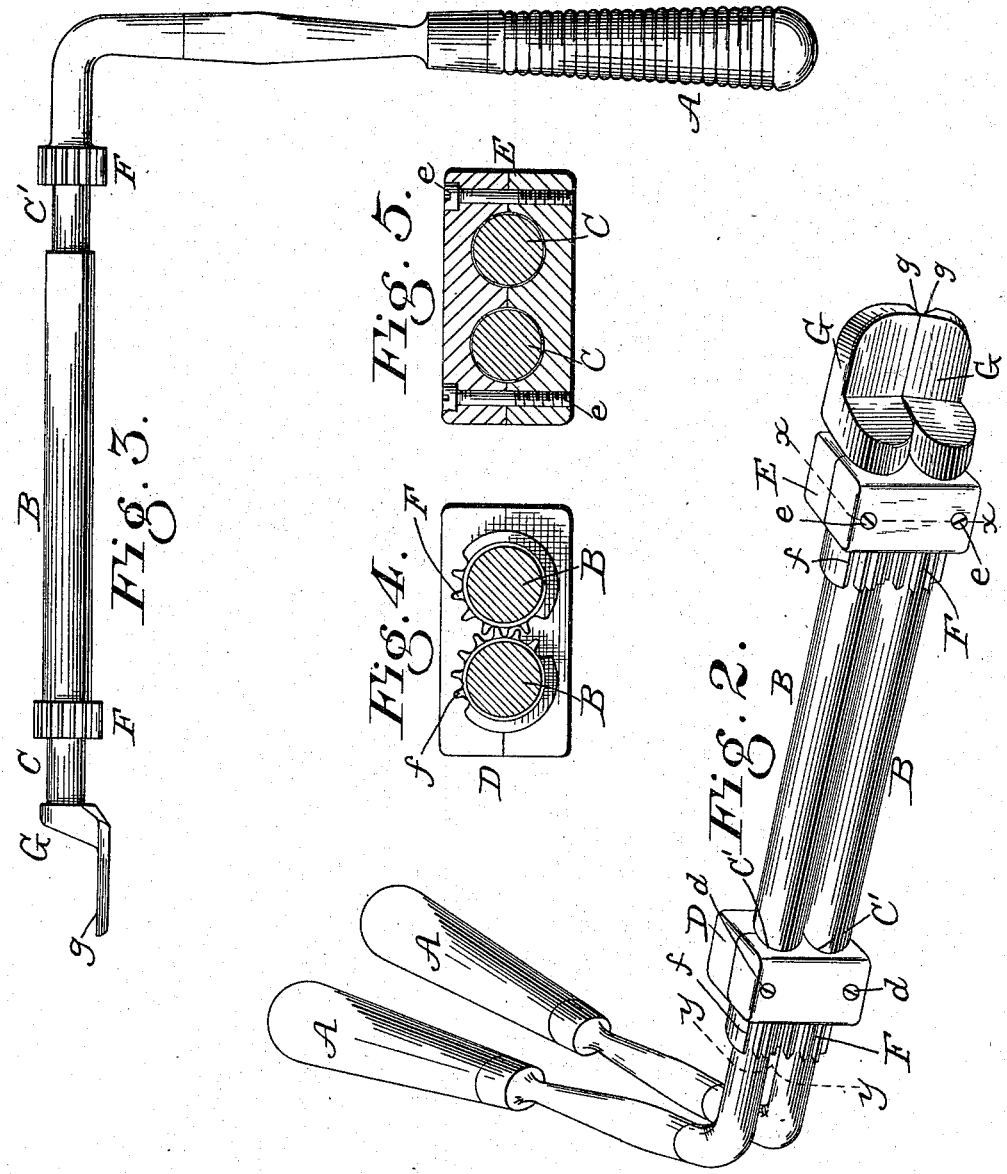
(No Model.) 2 Sheets—Sheet 2.
T. J. PENCE.
VETERINARY TOOTH CUTTER.
No. 571,283. Patented Nov. 10, 1896.

UNITED STATES PATENT OFFICE.

THOMAS JEFFERSON PENCE, OF TROY, OHIO.

VETERINARY TOOTH-CUTTER.

SPECIFICATION forming part of Letters Patent No. 571,283, dated November 10, 1896.

Application filed October 26, 1895. Serial No. 566,997. (No model.)

*To all whom it may concern:*

Be it known that I, THOMAS JEFFERSON PENCE, a citizen of the United States, residing at Troy, in the county of Miami and State of Ohio, have invented certain new and useful Improvements in Veterinary Molar-Tooth Cutters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in veterinary molar-tooth or bone cutters; and it consists in the peculiar construction and novel combination of parts, as hereinafter fully described, and particularly pointed out in the claims.

As is well known to those skilled in the art of veterinary dentistry, where there is a shivering off of any number of teeth, either from decay or other cause, the teeth or tooth directly opposite on the other jaw will gradually grow out of line into this opening. It is also of frequent occurrence for protuberances or projections to grow from animal's teeth, which being of a sharp jagged form the membrane lining of the cheek is frequently cut or lacerated, also the tongue, thus interfering with the proper mastication and digestion of food, thereby impairing their health and necessitating the use of a veterinary molar-tooth cutter, so as to sever or cut off the projecting tooth or protuberance.

The objects and advantages sought and attained by my improved veterinary molar-tooth cutter are, first, in being able with great ease to make a quick, clear, clean cut of any sized tooth without injury to the other teeth or laceration of the animal's mouth; second, less liability of getting out of order, and yet the simplicity, great strength, and durability of construction; third, the small cost of manufacture; fourth, facility and ease of transportation and package.

Referring to the accompanying drawings, illustrating my invention, and in which similar letters of reference indicate like parts in the several views, Figure 1 is a perspective view of my improved veterinary molar-tooth cutter in position for use. Fig. 2 is a perspective view thereof with the cutting edges together just after performing an operation. Fig. 3 is a side elevation of one of the roller-bars. Fig. 4 is an enlarged view of one of the boxes or bearings, taken on the line *y y*, Fig. 2. Fig. 5 is an enlarged cross-sectional view of one of the boxes or bearings, taken on the line *x x*, Fig. 2.

A A are two plain or turned handles, preferably made detachable by means of screw-threads, as shown at *a*, for convenience in transportation and package in a surgical-instrument case; or these handles may be non-detachable and made integral with and a part of the roller-bars and of any particular style or form without departing from the spirit of my invention. Said handles are by means of the screw-threaded end *b* of each of the two parallel roller-bars B B connected at right angles thereto for the purpose of allowing the veterinarian or operator to gain more power and control over the instrument. Said roller-bars B B are slightly shouldered out or cut away, as shown at C' and C, Fig. 3, to receive boxes or bearings D and E, which are constructed in the ordinary manner, the upper and lower sections being held together by countersunk screws *d d* and *e e*. Said boxes or bearings D and E serve for the purpose of holding said roller bars or arms B B in a parallel position as they roll or rotate toward each other when the handles A A are brought together, and by means of the sector-gears F F on one roller-bar meshing with the sector-gears *f f* on the other roller-bar, and thus the parallel cutter-jaws G G at the other end of the roller-bars, as they come together, cause their parallel cutting edges *g g* to meet evenly from heel to toe, thus making a clean clear cut of the tooth or bone to be cut or severed. Said parallel cutter-jaws G G have the advantage of being inserted into the animal's mouth edgewise, (see Fig. 1,) thus preventing injury by spreading or pressing out the other teeth, as in the large clumsy instruments heretofore used.

The sector-gears F F and *f f* may be integral with the roller-bars or removable therefrom, as I do not limit myself to any precise form or style of construction of any of the several parts of my improved veterinary molar-tooth cutter; but

What I claim as new, and desire to secure by Letters Patent, is—

1. A veterinary tool, composed of parallel roller-bars, formed with sector-gears thereon, each of said bars being provided at one end with a handle and at the other end with a cutting edge, and connected by bearing-boxes, substantially as described.

2. A veterinary molar-tooth cutter, comprising two parallel roller-bars, each of said bars being provided at one end with a detachable handle and at the other end with a cutter-jaw integral with the bar, and bearing-boxes for connecting said bars together, substantially as described.

3. A veterinary molar-tooth cutter, comprising parallel bars adapted to receive a partial rotation and provided at one end with a handle, bearing-boxes for connecting said bars, and a cutter-jaw having a cutting edge carried by the other end of each of the parallel bars, substantially as shown and described.

4. An instrument for veterinary purposes, comprising parallel roller-bars each provided at one end with a handle, means secured to each bar for guiding the same during partial rotation of the bars, bearing-boxes for connecting said bars, and a cutter-jaw formed at the other end of each bar, substantially as described.

5. An instrument for veterinary purposes, comprising parallel bars provided at one end with a handle, and each bar being reduced at two points to receive bearing-boxes for connecting the bars together, sector-gears secured to each bar at two points, and a cutter-jaw formed at the other end of each bar, substantially as described.

In testimony whereof I affix my signature in presence of two witnesses.

THOMAS JEFFERSON PENCE.

Witnesses:
  JOHN H. JULIAN,
  JAMES KNIGHT.